(12) United States Patent
Ehrstrom et al.

(10) Patent No.: US 7,490,752 B2
(45) Date of Patent: Feb. 17, 2009

(54) MANUFACTURING METHOD FOR FRICTION WELDED ALUMINUM ALLOY PARTS

(75) Inventors: Jean-Christophe Ehrstrom, Echirolles (FR); Timothy Warner, Voreppe (FR)

(73) Assignee: Alcan Rhenalu, Paris (FR)

(*) Notice: Subject to any disclaimer, the term of this patent is extended or adjusted under 35 U.S.C. 154(b) by 350 days.

(21) Appl. No.: 10/849,525

(22) Filed: May 20, 2004

(65) Prior Publication Data

US 2005/0011932 A1 Jan. 20, 2005

(30) Foreign Application Priority Data

May 20, 2003 (FR) .................................. 03 06036

(51) Int. Cl.
*B23K 20/12* (2006.01)

(52) U.S. Cl. .................. 228/112.1; 228/2.1; 228/114

(58) Field of Classification Search .............. 228/112.1, 228/2.1, 114, 46, 222, 2.3; 148/688, 689, 148/690, 691; 428/615
See application file for complete search history.

(56) References Cited

U.S. PATENT DOCUMENTS

| | | | | |
|---|---|---|---|---|
| 4,861,391 A | * | 8/1989 | Rioja et al. | .................. 148/564 |
| 5,178,695 A | * | 1/1993 | LaSalle et al. | .............. 148/698 |
| 5,211,910 A | | 5/1993 | Pickens et al. | |
| 5,560,789 A | * | 10/1996 | Sainfort et al. | .............. 148/549 |
| 5,882,449 A | * | 3/1999 | Waldron et al. | ............. 148/693 |
| 6,168,067 B1 | * | 1/2001 | Waldron et al. | .......... 228/112.1 |
| 6,768,067 B2 | * | 7/2004 | Adachi et al. | ............ 200/61.54 |
| 6,780,525 B2 | * | 8/2004 | Litwinski | ..................... 428/615 |
| 6,802,444 B1 | * | 10/2004 | Petter et al. | .............. 228/112.1 |
| 6,843,093 B2 | * | 1/2005 | Lindner et al. | ................. 72/254 |
| 6,994,760 B2 | * | 2/2006 | Benedictus et al. | ......... 148/552 |

FOREIGN PATENT DOCUMENTS

| | | |
|---|---|---|
| EP | 0936278 | 8/1999 |
| EP | 1334793 | 8/2003 |
| FR | 2748035 | 10/1997 |
| JP | 2000 237882 | 9/2000 |
| WO | WO 2004001086 | * 12/2003 |

OTHER PUBLICATIONS

Hassan et al, "Stability of Nugget Zone Grain Structures in High-Strength Al-alloy Friction Stir Welds During Solution Treatment", Acta Materialia vol. 51, 2003, pp. 1923-1936.

* cited by examiner

*Primary Examiner*—Kevin P Kerns
*Assistant Examiner*—Michael Aboagye
(74) *Attorney, Agent, or Firm*—Baker, Donelson, Bearman, Caldwell & Berkowitz, P.C.

(57) ABSTRACT

A method for manufacturing aluminium alloy parts with precipitation hardening including friction stir welding of at least two elements made from the same alloy or different alloys, solution heat treatment, and quenching of welded parts, in which the elements are subjected to heat treatment before welding at temperature T for at least $2t_1$, $t_1$ being defined as the minimum treatment duration at temperature T leading to a specific melting peak energy defined by AED equal to less than 1 J/g. A method according to the invention substantially avoids an increase in the grain size following solution heat treatment after welding. The invention further relates to novel aluminum materials as well as uses therefor.

13 Claims, 1 Drawing Sheet

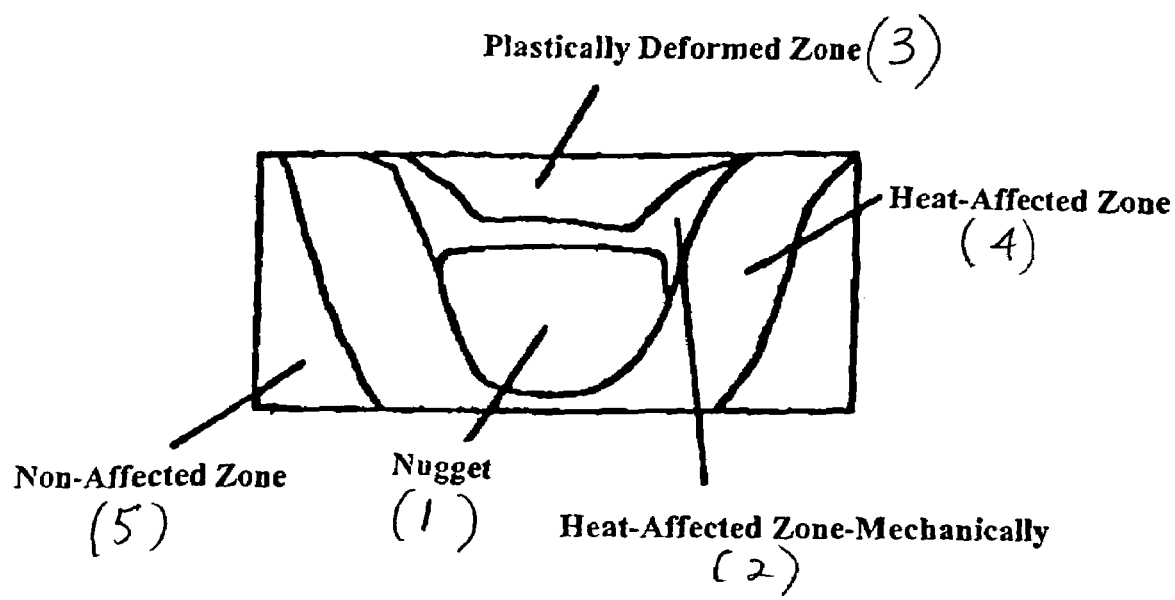

MANUFACTURING METHOD FOR FRICTION WELDED ALUMINUM ALLOY PARTS

CROSS REFERENCE TO RELATED APPLICATIONS

This application claims priority under 35 USC 119 from FR 0306036, filed May 20, 2003, the content of which is incorporated herein by reference in its entirety.

BACKGROUND OF THE INVENTION

1. Field of the Invention

The present invention relates generally to a method for manufacturing aluminium alloy parts with precipitation hardening obtained by friction stir welding or FSW. Aluminium alloys with precipitation hardening are denoted in the 2xxx (Al—Cu), 4xxx (Al—Si), 6xxx (Al—Si—Mg), 7xxx (Al—Zn—Mg or Al—Zn—Mg—Cu) or 8xxx (Al—Li—Cu) series according to the Aluminum Association nomenclature. These alloys are hardened by heat treatment including solution heat treatment, quenching and possibly annealing.

2. Description of Related Art

Friction stir welding was initiated in the early 1990s by TWI (The Welding Institute) in the United Kingdom, and has been used in assembling aluminium alloys. Its principle is to obtain a weld without melting the metal, by applying strong shear to the metal using a rotating tool that stirs the two materials to be assembled. First, the yield stress is reduced by heating the metal by applying friction using a shoulder portion of the rotating tool to the metal surface, and the tool is then moved to make the weld by gradually moving it in a forward direction. The shoulder portion of the tool also contains the metal and maintains the pressure to avoid metal ejection outside the welded zone.

The process avoids hot cracking problems, which in particular means that alloys that were previously considered as not being weldable by fusion, can now be welded. For example, 2000 series magnesium alloys or 7000 series copper alloys were previously considered not fusion weldable, but can be subjected to friction stir welding. These alloys are widely used in aeronautical construction, and hence, being able to subject them to friction stir welding is advantageous.

The metallurgical structure inside and around the friction stir welded zone gives a very characteristic facet, which is significantly different from the facet obtained with fusion weld. Apart from zones remote from the weld that are completely unaffected, three distinct zones can be distinguished, as shown in FIG. 1:

1—the zone affected by the most severe plastic deformation is called the nugget. It has a very fine recrystallised microstructure which is relatively equiaxial, with significant decorations at the grain boundaries. During welding, the temperature can reach 560° C. in this zone. It also has an onion skin type annular structure. The width of the nugget is usually slightly more than the tool diameter.

2—the second zone on each side of the nugget is the thermo-mechanically affected zone, which deformed to a lesser extent and which, depending on the alloy, may show signs of recrystallisation.

3—the third zone above the nugget is called the "plastically deformed zone" and is formed by the rotation effect of the tool shoulder.

Different assembly configurations are possible, but the most frequently used is butt welding.

Friction stir welding leads to very small grains, typically of the order of a few micrometers. These small grains in the as-welded condition contain a high amount of energy stored in the grain boundaries of the welded zone and of the heat-affected zone. This microstructure is therefore unstable.

The weak point of any welded part is the heat-affected zone, regardless of the process used. One known method of eliminating this weak point is to apply solution heat treatment to the welded boundary so as to permit a high mechanical strength at all points. During solution heat treatment, the energy stored in the grain boundaries is released. Hence, the average grain size in the nugget and in the plastically deformed zone is considerably increased, and can be as high as several mm. This uncontrolled grain growth is due to a so-called "secondary recrystallization." An article by Kh. A. A. Hassan et al "Stability of nugget zone grain structures in high-strength Al-alloy friction stir welds during solution treatment" published in Acta Materialia vol. 51, 2003, pp. 1923-1936 clearly defines this abnormal growth in the grain size, and indicates that solutions for dealing with the same include (i) increasing the density of the dispersoids (which will slow down or block this growth mechanism), or (ii) controlling the heat quantity generated during welding (which will lead to less energy stored in the grain boundaries, and thus to a coarser grain structure).

A coarse grain structure is typically not very favorable for good mechanical behavior, particularly with respect to ductility, fracture toughness and fatigue strength, which makes subsequent shaping difficult and causes inter-granular failures.

SUMMARY OF THE INVENTION

A purpose of developing the present invention was to overcome the above listed as well as other disadvantages.

In accordance with the present invention, there is provided a process for manufacturing aluminium alloy parts with precipitation hardening utilizing friction stir welding of at least two elements made from the same alloy or different alloys, after solution heat treatment and quenching of welded parts. In accordance with the present invention, the elements are preferably subjected to heat treatment before welding at a temperature T for at least $2t_1$, where $t_1$ is defined as being the minimum treatment duration at temperature T leading to a specific melting peak energy defined by DSC (Differential Scanning Calorimetry) equal to at least 1 J/g and preferably less than 0.5 J/g and even better less than 0.1 J/g.

The present invention if further directed to parts and aeronautical constructions and related articles. Parts of the instant invention include friction stir welded parts, wherein in a welded zone thereof, the micrography comprises a fine crystalline structure with a relatively homogenous grain size between 50 and 200 μm.

Additional objects, features and advantages of the invention will be set forth in the description which follows, and in part, will be obvious from the description, or may be learned by practice of the invention. The objects, features and advantages of the invention may be realized and obtained by means of the instrumentalities and combination particularly pointed out in the appended claims.

BRIEF DESCRIPTION OF THE DRAWING

FIG. 1 shows the different zones of the joint welded by typical friction stir welding.

DETAILED DESCRIPTION OF A PREFERRED EMBODIMENT

The temperature T is usually less than the alloy burning temperature by preferably not more than 20° C., or if different alloys are used, the lowest burning temperature of these alloys.

If the burning temperature is less than about 500° C., the treatment duration is advantageously at least 24 h, and is preferably not less than 48 h.

In further accordance with the present invention, there is provided a part comprising at least two friction stir welded elements made of an aluminium alloy subjected to precipitation hardening, and treated after welding by solution heat treatment and quenching. The part preferably has a grain size in a welded zone thereof after solution heat treatment and quenching, of less than about 200 μm.

The designation of standardised alloys follows the rules of The Aluminum Association. All concentrations of chemical elements are expressed in percent by mass.

According to the present invention, an intensive heat treatment is preferably applied before welding to cause coalescence of dispersoids. A heat treatment of the present invention is preferably significantly longer than the normal homogenization or solution heat treatment time for the same alloy. To be efficient, the heat treatment according to the invention is advantageously made at a temperature T and its duration is suitably at least $2t_1$, where to is the typical duration of the solution heat treatment defined as being the duration of a treatment at temperature T leading to a specific energy of the melting peak of the same alloy, as determined by differential scanning calorimetry (DSC), with an absolute value less than 1 J/g, and preferably less than 0.5 J/g and even better less than 0.1 J/g.

The temperature T is usually as close as possible to the "burning" temperature of the alloy, although it is advantageous in some embodiments to avoid reaching the burning temperature. In practice, the difference from the burning temperature preferably is less than about 20° C.

If the elements to be welded are made of different alloys, the lowest burning temperature should generally be used. For alloys for which the burning temperature is less than 500° C., the treatment time is suitably more than 24 h and preferably more than 48 h.

The present invention can be applied to virtually any alloy including all heat-treatable aluminum alloys. Alloys with a solution heat treatment temperature below 500° C. are preferred in some cases. Al—Zn—Cu—Mg alloys (7xxx series) and Al—Cu—Mg alloys (2xxx series) may be preferred over Al—Cu—Mg—Li alloys with high lithium content (above about 1.2%) and over alloys of the 6xxx series.

The heat treatment according to the present invention may be done at any stage in the manufacturing procedure, and preferably before welding. It may preferably include prolonged homogenization before rolling, extrusion or forging, and/or intermediate heating between two hot rolling or forging passes, and/or treatment of a partly finished rolled, extruded or forged product before welding. Experience also shows that the best results may be obtained in some situations when most or at least some of the alloying elements are in solid solution, for example, in the aluminium. The metallurgical structure can be further improved after welding by limiting the content of dispersoids, for example by choosing chemical compositions with a low content of anti-recrystallising elements (e.g. Mn, Cr, Zr, Hf, V, Sc). For example, for a 2024 type alloy, it may be preferable to limit the manganese content to less than 0.3% (in this case, the alloy composition no longer fits the standardized composition of AA 2024, but deviates only for the manganese content), and for copper-containing alloys of the 7xxx series it may be preferable to limit the chromium content to less than about 0.15% and the zirconium content to less than about 0.09%. The term "copper-containing alloys of the 7xxx series" is understood here as a standardized alloy for which the composition standard specifies a minimum concentration of copper (for example the alloys of the type 7x49: 7049, 7149, 7249, 7349, 7449, the alloys 7050, 7055, 7150, 7060, 7075, 7175, 7475), or more generally an Al—Zn—Mg—Cu alloy with a copper content of at least about 0.5%.

In a preferred embodiment of the present invention, the alloy(s) are hot transformed (typically by rolling, extrusion or forging), then a thermal treatment leading to the coalescence of dispersoids is carried out and the product is allowed to cool down in free air. Finally, friction stir welding is performed. The welded part is then solution heat treated, quenched and artificially aged according to any desired technique known in the art.

The welded part may comprises any desired material such as sheet metal plates, rolled sections or forged products or the like. These products may be in any desired state such as in their as-produced state (F state) or treated by solution heat treatment, then quenched and possibly annealed (states T3, T6 or T7). If plates in the treated state are welded, in other words if they have already been subjected to solution heat treatment under normal conditions, it is found that this solution heat treatment may not be sufficient in some instances to obtain a fine grain structure after a post-welding treatment.

Usually, the formation of oxides is observed in the center of the welded zone during welding. These oxides may be harmful to good mechanical behavior of the weld. To prevent oxidation, it may be advantageous to perform welding under inert gas atmosphere in any desired way, typically by flushing inert gas over the welding zone during welding.

A process according to the instant invention can be used to obtain friction stir welded parts, such as those made of one or more aluminium alloys with precipitation hardening in which, after welding and solution heat treatment, quenching and/or annealing, the grain size in the welded zone remains relatively homogenous and is preferably less than about 200 μm, so that good fatigue strength, improved toughness and satisfactory ductility can be obtained.

Such pieces can be used for any desired purpose, e.g. for the manufacture of structural members for aeronautical construction.

EXAMPLES

The following examples are illustrative and not intended as limiting of the present invention.

Example 1

Sheet metal plates made of 7449 alloy were made with the following composition (% by weight):

| Zn | Mg | Cu | Si | Fe | Zr | Cr | Ti |
|---|---|---|---|---|---|---|---|
| 8.11 | 2.19 | 1.94 | 0.04 | 0.07 | 0.09 | 0.005 | 0.025 | by semi-continuous casting of a plate, followed by homogenization for 30 minutes at a temperature of 475° C. and hot rolling to a thickness of 10 mm. The plates were cut to 260×1000 mm. These plates were treated in the T651 state by solution heat treatment for ½ h at 474° C., followed by quenching in cold water, controlled tension to 2.5% permanent elongation and annealing for 48 h at 120° C.

The plates were butt welded by friction stir welding using a "Superstir™" type ESAB machine. The tool head was inclined at 2.5 degrees. The rotation speed of the tool was 150 rpm and its advance speed was 200 mm/minute.

The assembled plates were then subjected to a solution heat treatment after welding including solution heat treatment at 474° C. for 30 minutes followed by quenching in cold water (20° C.). A sample micrography of the welded zone treated by anodic oxidation to reveal the granular structure shows a recrystallised structure with grain size more than 200 μm with a strong dispersion, with some grains as large as several mm.

Example 2

Plates substantially identical to those welded in example 1 were subjected to a homogenization treatment for 72 h at 474° C. They were welded under the same conditions as in example 1.

The micrography of the welded zone reveals a fine crystalline structure with a relatively homogenous grain size between 50 and 200 μm, with an average on the order of 120 μm.

Additional advantages, features and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

All documents referred to herein are specifically incorporated herein by reference in their entireties.

As used herein and in the following claims, articles such as "the", "a" and "an" can connote the singular or plural.

The invention claimed is:

1. A method for manufacturing aluminum alloy parts with precipitation hardening comprising:
    subjecting at least two elements made from the same alloy or different alloys to heat treatment at a temperature T for at least $2t_1$, wherein $t_1$ comprises a minimum treatment duration at temperature T leading to a specific melting peak energy defined by Differential Scanning Calorimetry of less than 1 J/g, and wherein the treatment duration is at least 72 hours;
    after said heat treatment, friction stir welding said at least two elements; and thereafter
    conducting a solution heat treatment, and
    quenching welded parts.

2. A method according to claim 1, wherein the specific melting peak energy is less than 0.5 J/g.

3. A method according to claim 2, wherein the specific melting peak energy is less than 0.1 J/g.

4. A method according to claim 1, wherein the temperature T is less than the alloy burning temperature by not more than 20° C., or if different alloys are used, the lowest burning temperature of these alloys.

5. A method according to claim 1, wherein the heat treatment is done at a homogenization stage before rolling, extrusion, or forging.

6. A method according to claim 1, wherein the heat treatment is reheating between two hot rolling, extrusion, or forging passes.

7. A method according to claim 1, wherein the heat treatment is conducted on a partly finished rolled or forged product before welding.

8. A method according to claim 7, wherein the heat treatment is followed by quenching.

9. A method according to claim 1, wherein at least one of the alloys is a 2024 alloy having a manganese content by weight of less than about 0.3%.

10. A method according to claim 1, wherein at least one alloys comprises a copper-containing alloy of the 7xxx series having a chromium content by weight of less than about 0.15%, and a zirconium content by weight of less than about 0.09%.

11. A method according to claim 10, wherein the copper content is at least about 0.5%.

12. A method according to claim 1, wherein inert gas is flushed over the surface of a welding zone, during welding.

13. A method for manufacturing aluminum alloy parts with precipitation hardening comprising:
    subjecting at least two elements made from the same alloy or different alloys to a homogenization heat treatment at a temperature T for at least $2t_1$, wherein $t_1$ comprises a minimum treatment duration at temperature T leading to a specific melting peak energy defined by Differential Scanning Calorimetry of less than 1 J/g, wherein the temperature T is less than a burning temperature of the alloy, or a lowest burning temperature of the different alloys, by not more than 20° C.;
    after said homogenization heat treatment, friction stir welding said at least two elements; and thereafter
    conducting a solution heat treatment, and
    quenching welded parts.

\* \* \* \* \*